(12) United States Patent
Mellis

(10) Patent No.: US 6,227,609 B1
(45) Date of Patent: May 8, 2001

(54) VEHICLE DOOR REINFORCING BEAM AND METHOD OF MAKING IT

(75) Inventor: Jay Mellis, Romeo, MI (US)

(73) Assignee: Cosma International Inc., Aurora (CA)

( * ) Notice: Subject to any disclaimer, the term of this patent is extended or adjusted under 35 U.S.C. 154(b) by 0 days.

(21) Appl. No.: 09/396,739

(22) Filed: Sep. 15, 1999

Related U.S. Application Data
(60) Provisional application No. 60/100,570, filed on Sep. 16, 1998.

(51) Int. Cl.[7] .......................................................... B60J 5/04
(52) U.S. Cl. ........................ 296/188; 296/146.6; 52/735.1
(58) Field of Search .............................. 296/146.6, 146.5, 296/188, 189; 52/735.1, 731.6; 49/502

(56) References Cited

U.S. PATENT DOCUMENTS

| | | | |
|---|---|---|---|
| 4,684,166 | * 8/1987 | Kanodia | 296/146.6 |
| 4,919,473 | 4/1990 | Laimighofer et al. | 296/188 |
| 5,092,512 | 3/1992 | Sturrus et al. . | |
| 5,104,026 | 4/1992 | Sturrus et al. . | |
| 5,272,841 | 12/1993 | Freeman et al. . | |
| 5,306,058 | 4/1994 | Sturrus et al. | 293/154 |
| 5,370,437 | * 12/1994 | Alberda | 296/146.6 |
| 5,600,931 | 2/1997 | Jonsson | 52/770.3 |
| 5,755,167 | 5/1998 | Ciucani . | |
| 5,755,484 | 5/1998 | Chou et al. . | |

FOREIGN PATENT DOCUMENTS

| | | |
|---|---|---|
| 29622985 | 10/1997 | (DE) . |
| 19715795 | 10/1998 | (DE) . |
| 0728607A2 | 8/1996 | (EP) . |
| 5286364 | * 11/1993 | (JP) ................................... 296/146.6 |
| 8-258569 | 10/1996 | (JP) . |
| 9-220930 | 8/1997 | (JP) . |

* cited by examiner

Primary Examiner—D. Glenn Dayoan
Assistant Examiner—Patricia L. Engle
(74) Attorney, Agent, or Firm—Pillsbury Winthrop LLP

(57) ABSTRACT

A vehicle door reinforcing beam cut and cold formed from a flat sheet of ultrahigh strength steel comprising a beam blank cut from a flat sheet of ultrahigh strength steel to provide an elongated generally flat central blank portion extending from end to end of the beam blank and integral side blank portions on opposite sides of the central blank portion. The central blank portion includes opposite end wall sections constructed and arranged to be fixedly secured to the vehicle door frame and an elongated central wall section extending between the end wall sections. The side blank portions include leg wall sections integral with the sides of the central wall section and bent by cold forming in a direction away from a flat surface of the central wall section to form a central reinforcing channel structure having leg section free ends defined by the leg wall sections adjacent the end wall sections and central wall section ends integral with the end wall sections. The central blank portion has notches formed therein at positions inwardly of the leg section free ends so as to limit the occurrence of distortional stresses occasioned by the cold form bending of the side wall sections to those insufficient to distort the generally flat extent of the end wall sections with respect to the central wall section. A method of making the beam including the steps of cutting the blank from a sheet of ultrahigh strength steel and bending the leg sections in a cold forming operation is also enclosed.

10 Claims, 4 Drawing Sheets

VEHICLE DOOR REINFORCING BEAM AND METHOD OF MAKING IT

This application claims benefit of Provisional appl. No. 60/100,570, filed Sep. 16, 1998.

FIELD OF INVENTION

This invention relates to vehicle door reinforcement and more particularly the formation of a reinforcing beam for a vehicle door.

BACKGROUND OF THE INVENTION

Reinforcing beams of the type herein contemplated are well known in the art. A typical commercially used beam is constructed of a piece of roll formed channel or flanged channel structure having separate end sections suitably fixed to opposite ends thereof. The fabricated structure is made of untempered steel and, after fabrication, the resultant beam structure is tempered in ovens to give it ultrahigh strength characteristics.

The requirement to separately fabricate at least three separate components and to then assemble the components materially contributes to the costs involved in producing the composite tempered beam. Another cost contributor is the need to heat temper the beams after fabrication.

There have been proposals in the patented literature to provide a beam with a one-piece construction. Examples are included in the disclosures of the following patents: U.S. Pat. No. 4,919,473 and Japanese Patent Publication No. 8-258569. The approach apparently taken in these designs is to achieve adequate strength by forming the beam with a steel having a strength something less than ultrahigh strength steel and compensating for the lesser material strength by constructing the beam with a special impact resistant cross-sectional configuration. Others have proposed utter simplicity in cross-sectional configuration and have provided the required strength by initially forming a composite laminar sheet. See, for example, U.S. Pat. No. 5,272,341.

The present invention is based upon gaining the necessary strength by utilizing ultrahigh strength steel as a starting material rather than achieving the desired strength after formation by heat tempering. Heat treating sheet steel while it is still in a roll or coil formation is more economical than heat treating individually fabricated structures even though the heat process is made as nearly "continuous" as possible.

The problem presented by utilizing ultrahigh strength steel as a starting material is that it is not easily cold formed into three dimensional configurations. Simple stamping operations often result in the creation of internal stresses which can distort portions of the formed sheet metal especially flat sections. There is a need to provide a reinforcing beam of the type discussed which can overcome the problems noted above.

BRIEF DESCRIPTION OF THE INVENTION

The disadvantages of the prior art may be overcome by providing a vehicle door reinforcing beam cut and cold formed from a flat sheet of ultrahigh strength steel comprising a beam blank cut from a flat sheet of ultrahigh strength steel to provide an elongated generally flat central blank portion extending from end to end of the beam blank and integral side blank portions on opposite sides of the central blank portion. The central blank portion includes opposite end wall sections constructed and arranged to be fixedly secured to the vehicle door frame and an elongated central wall section extending between the end wall sections. The side blank portions include leg wall sections integral with the sides of the central wall section and bent by cold forming in a direction away from a flat surface of the central wall section to form a central reinforcing channel structure having leg section free ends defined by the leg wall sections adjacent the end wall sections and central wall section ends integral with the end wall sections. The central blank portion has notches formed therein at positions outwardly of the leg section free ends so as to limit the occurrence of distortional stresses occasioned by the cold form bending of the side wall sections to those insufficient to distort the generally flat extent of the end wall sections with respect to the central wall section.

Preferably, the ultrahigh strength steel sheet from which the blank is cut is pretempered and flange wall sections are bent from the leg wall sections to provide a central reinforcing flanged channel structure.

According to another aspect of the invention, there is provided a method of making a vehicle door reinforcing beam including an elongated generally flat central blank portion and integral side blank portions on opposite sides of the central blank portion, in which the central blank portion including opposite end wall sections constructed and arranged to be fixedly secured to the vehicle door frame and an elongated central wall section extending between the end wall sections and the side blank portions include leg wall sections integral with the sides of the central wall section extending in a direction away from a flat surface of the central wall section to form a central reinforcing channel structure having leg section free ends defined by the leg wall sections adjacent the end wall sections and central wall section ends integral with the end wall sections. The method comprises cutting a beam blank from a flat sheet of ultrahigh strength steel with an outline defining the central and side blank portions and notches in the central blank portion at positions inwardly of the leg section free ends and bending the leg wall sections from the side of the central wall section in a cold forming operation in such a way that the notches limit the occurrence of distortional stresses to those insufficient to distort the generally flat extent of the end wall sections with respect to the central wall section.

DETAILED DESCRIPTION OF THE PREFERRED EMBODIMENT OF THE INVENTION

Figure 1:
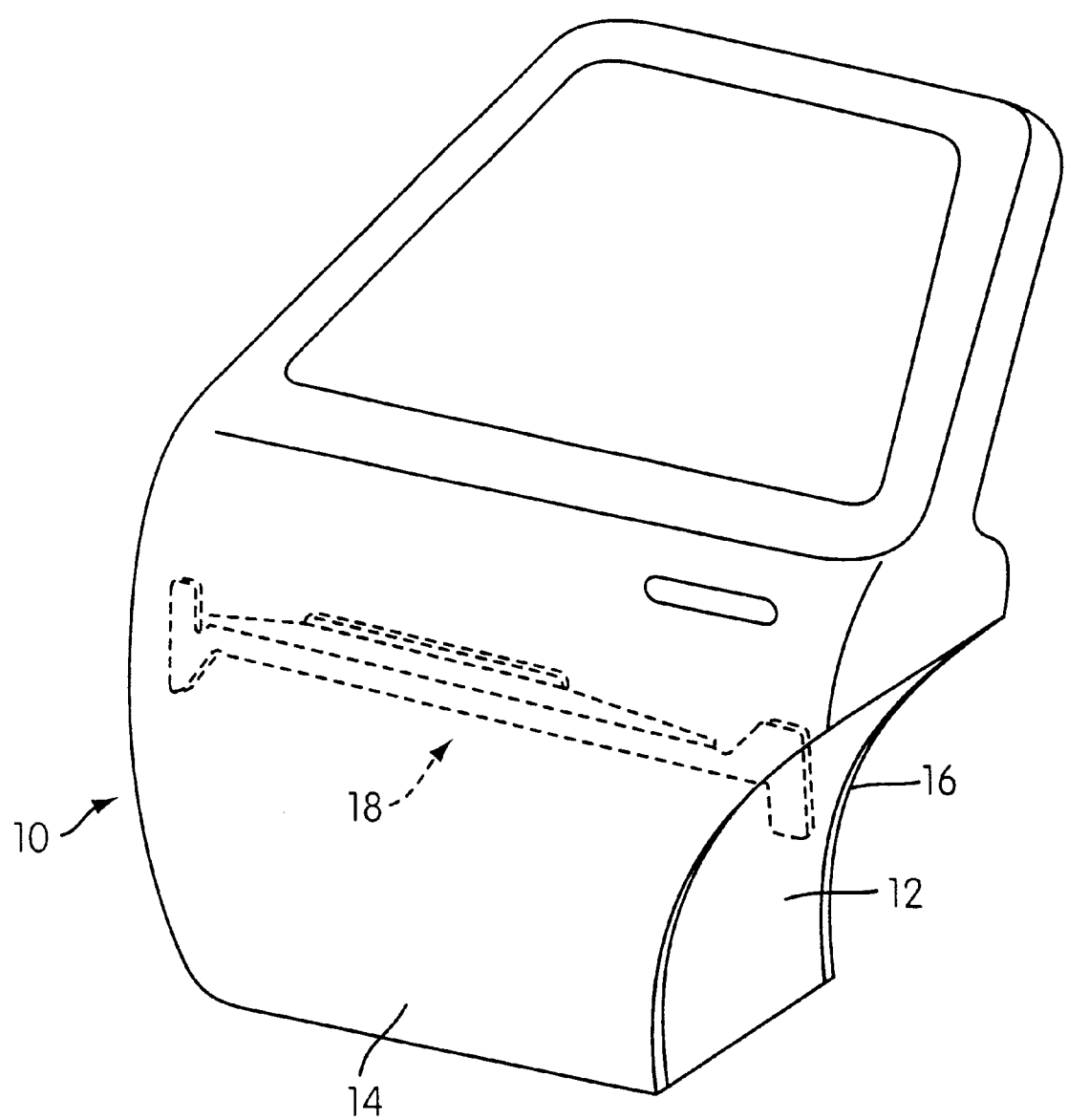
FIG. 1 is a perspective view of a beam reinforced vehicle door embodying the principles of the present invention.
Figure 2:
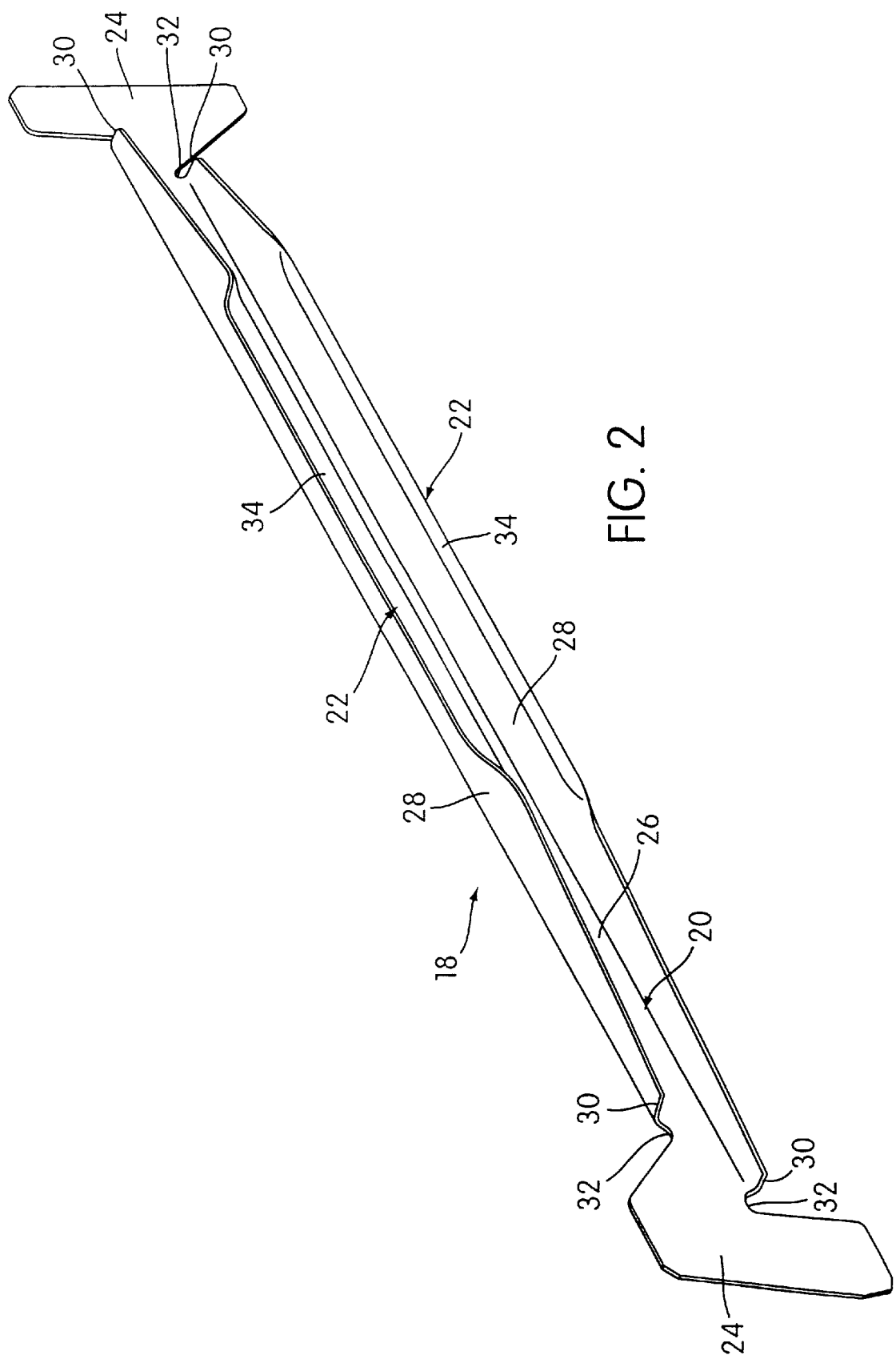
FIG. 2 is a perspective view of the vehicle door reinforcing beam shown in dotted lines in FIG. 1 which is constructed in accordance with the principles of the present invention.
Figure 3:
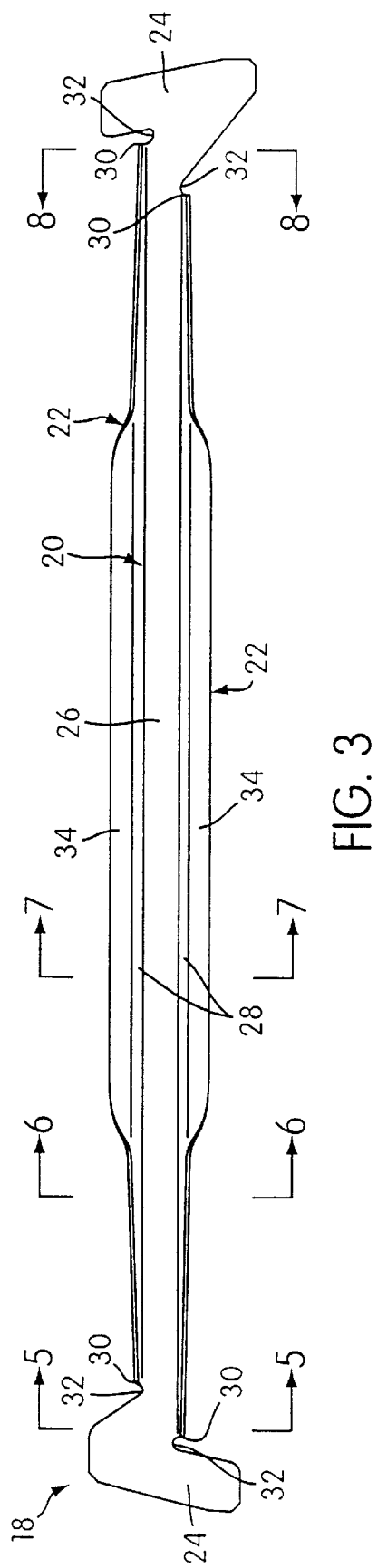
FIG. 3 is a side elevational view of the beam.
Figure 4:
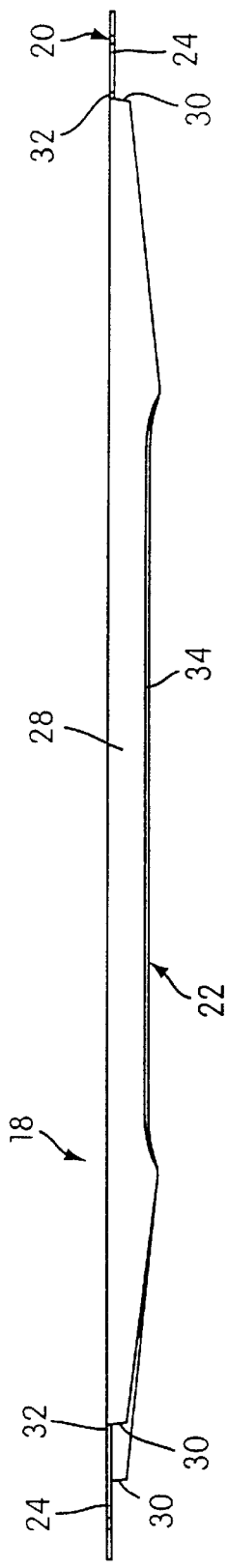
FIG. 4 is a top plan view of the beam.
Figure 5:
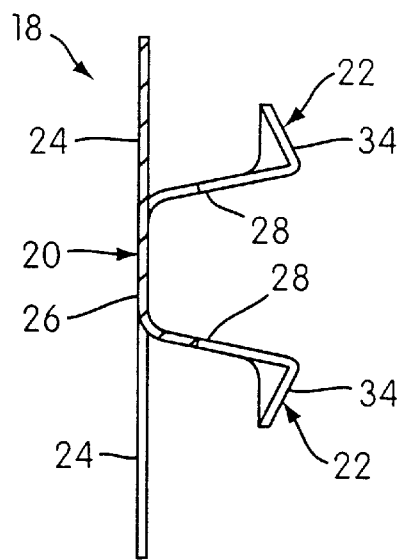
FIG. 5 is an enlarged sectional view taken along the line 5—5 of FIG. 3.
Figure 6:
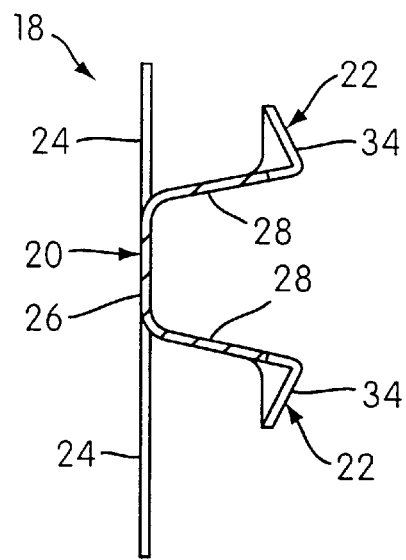
FIG. 6 is an enlarged sectional view taken along the line 6—6 of FIG. 3.
Figure 7:
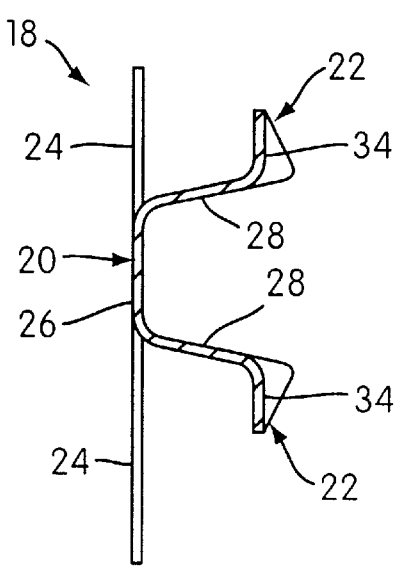
FIG. 7 is an enlarged sectional view taken along the line 7—7 of FIG. 3.
Figure 8:
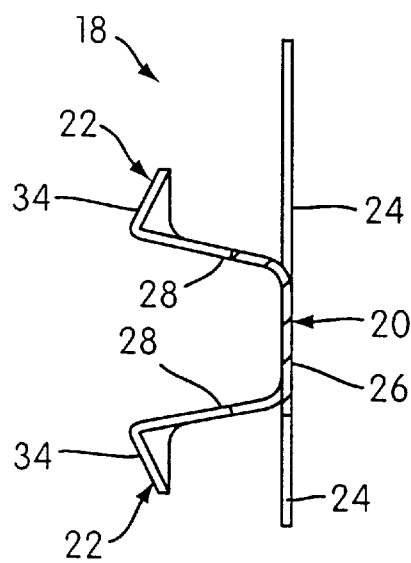
FIG. 8 is an enlarged sectional view taken along the line 8—8 of FIG. 3.

Referring now more particularly to the drawings, there is shown therein a beam reinforced vehicle door, generally indicated at 10, embodying the principles of the present invention. The door 10 has a conventional construction which includes an interiorly skeletonized frame 12 made out of sheet metal, an outer skin 14 and an inner panel 16. The interiorly skeletonized frame 12 is interiorly reinforced by a beam shown in dotted lines in FIG. 1 and generally indicated at 18. The beam 18 is cold formed in accordance with the principles of the present invention from a beam blank cut from a flat sheet of pretempered ultrahigh strength steel. The term "pretempered" as used herein refers to sheet steel which is heat treated to improve its tensile strength characteristics while in an endless web configuration and excludes steel which has been heat treated for improved tensile strength after being fabricated. The term "ultrahigh strength steel" is steel having a tensile strength of 120,000 psi (84,373,000 kilograms per square meter) and above. The type of steel herein contemplated is the same as those examples set forth described in U.S. Pat. No. 5,306,058, the disclosure of which is hereby incorporated by reference into the present specification.

The outline of the beam blank which is cut from the flat sheet of pretempered ultrahigh strength steel defines the free edges of the beam 18 which is fixedly secured at its ends to the skeletonized frame 12 of the door between the exterior skin 14 and the interior panel 16 thereof by any suitable means such as welding or the like.

As best shown in FIGS. 2–8, the outline of the beam blank defines an elongated generally flat central blank portion, generally indicated at 20, extending from end to end of the beam blank and integral side blank portions, generally indicated at 22, on opposite sides of the central blank portion 20. The central blank portion 20 includes opposite flat end wall sections 24 constructed and arranged to be fixedly secured to the vehicle door frame 12 and an elongated central wall section 26 extending between the end wall sections 24. As can be seen from the drawings, the preferred construction of the end wall sections 24 and the central wall section 26 is such that the oppositely facing flat surfaces defining each are disposed in common parallel planes.

The side blank portions 22 include leg wall sections 28 integral with the sides of the central wall section 26. Leg wall sections 28 are bent by cold forming in a direction away from a flat surface of the central wall section 26 to form a central reinforcing channel structure having a generally U-shape. The leg wall sections 28 terminate at leg section free ends 30. In accordance with the principles of the present invention, the central blank portion 20 is formed with notches 32 therein at positions outwardly of the leg section free ends 30. As can be seen from the drawings, the end wall sections 24 extend transversely outwardly of the notches 32 and the transverse extent of the elongated central wall section 26. The notches 32 are configured to limit the occurrence of distortional stresses occasioned by the cold form bending of the leg wall sections 28 to those insufficient to distort the generally flat extent of the end wall sections 24 with respect to the central wall section 26. In this way, securement of the beam 18 to the door frame 12 in a condition which accurately positions it between the outer skin and inner panel of the door is assured.

Preferably, the side blank portions 22 are also bent by cold forming to define a pair of outwardly extending flange wall sections 34 on the central portion of the leg wall sections 28. As can be seen from the drawings, the flange wall sections have opposite ends spaced inwardly from the opposite free ends 30 of the leg wall sections 28. Moreover, the transverse extent of each leg wall section 28 increases from the free ends 30 thereof to the adjacent end of the flange wall section 34 thereon. The flange wall sections 34 which have a generally constant transverse extent tend to provide additional strength to the beam 18 and to provide the reinforcing structure as a flanged channel structure to achieve the added strength thereof.

In a specific example of the method of the present invention, a beam blank was cut from a sheet of martensitic steel of 0.062 inches (0.15748 cm) thickness having an ultrahigh tensile strength of 220,000 psi (154,682,000 kilograms per square meter). The outline of the blank included the central portion 20 and side portions 22 in the configuration shown and the notches 32 in the location and configuration shown. The blank was cut in a cold form stamping operation during one cycle of movement of cooperating cutting dies. The blank was bent to form the leg wall sections 28 and the flange wall sections 34 in a cold form stamping operation during one cycle of movement of cooperating bending dies.

In the exemplary embodiment, the cutting and bending operations were formed on different machines although both operations could be performed on a single machine.

Any U.S. patents or patent applications mentioned or cited hereinabove are hereby incorporated by reference into the present application.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A vehicle door reinforcing beam cut and cold formed from a flat sheet of ultrahigh strength steel comprising a beam blank cut from a flat sheet of ultrahigh strength steel, said beam blank having an elongated generally flat central blank portion extending from end to end of said beam blank and integral side blank portions on opposite sides of said central blank portion, said central blank portion including opposite end wall sections constructed and arranged to be fixedly secured to a vehicle door frame and an elongated central wall section extending between said end wall sections, said side blank portions including leg wall sections integral with the sides of said central wall section and bent by cold forming in a direction away from a flat surface of said central wall section to form a central reinforcing channel structure having 1) leg section free ends defined by said leg wall sections adjacent said end wall sections and 2) central wall section ends integral with said end wall sections, said central blank portion having notches formed therein at positions outwardly of the leg section free ends so as to limit the occurrence of distortional stresses occasioned by the cold form bending of said side wall sections to those insufficient to distort the generally flat extent of said end wall sections with respect to said central wall section.

2. A vehicle door reinforcing beam as defined in claim 1 wherein said side blank portions are bent by cold forming to provide a pair of outwardly extending flange wall sections on said leg wall sections to form said central reinforcing channel structure into a central reinforcing flanged channel structure.

3. A vehicle door reinforcing beam as defined in claim 2 wherein said pair of outwardly extending flange wall sections have opposite ends spaced from the free ends of said leg wall sections, each of said leg wall sections having a transverse extent which increases from the free ends thereof to adjacent ends of the flange wall section thereon.

4. A vehicle door reinforcing beam as defined in claim 3 wherein said flange wall sections have generally constant transverse extents.

5. A vehicle door reinforcing beam as defined in claim 4 wherein said end wall sections extend transversely outwardly of said notches and the transverse extent of said central wall section.

6. A vehicle door reinforcing beam as defined in claim 5 wherein said end wall sections and said central section are defined by oppositely facing flat surfaces disposed in common parallel planes.

7. A vehicle door reinforcing beam as defined in claim 6 wherein said flat sheet of ultrahigh strength steel is martensitic steel having a thickness of approximately 0.062 inches and an ultrahigh tensile strength of 220,000 psi.

8. A vehicle door reinforcing beam as defined in claim 1 wherein said end wall sections extend transversely outwardly of said notches and the transverse extent of said central wall section.

9. A vehicle door reinforcing beam as defined in claim 1 wherein said end wall sections and said central section are defined by oppositely facing flat surfaces disposed in common parallel planes.

10. A vehicle door reinforcing beam as defined in claim 1 wherein said flat sheet of ultrahigh strength steel is martensitic steel having a thickness of approximately 0.062 inches and an ultrahigh tensile strength of 220,000 psi.

* * * * *